W. A. DORSEY.
CAR WHEEL AND AXLE.
APPLICATION FILED JULY 3, 1914.
1,129,855.
Patented Mar. 2, 1915.
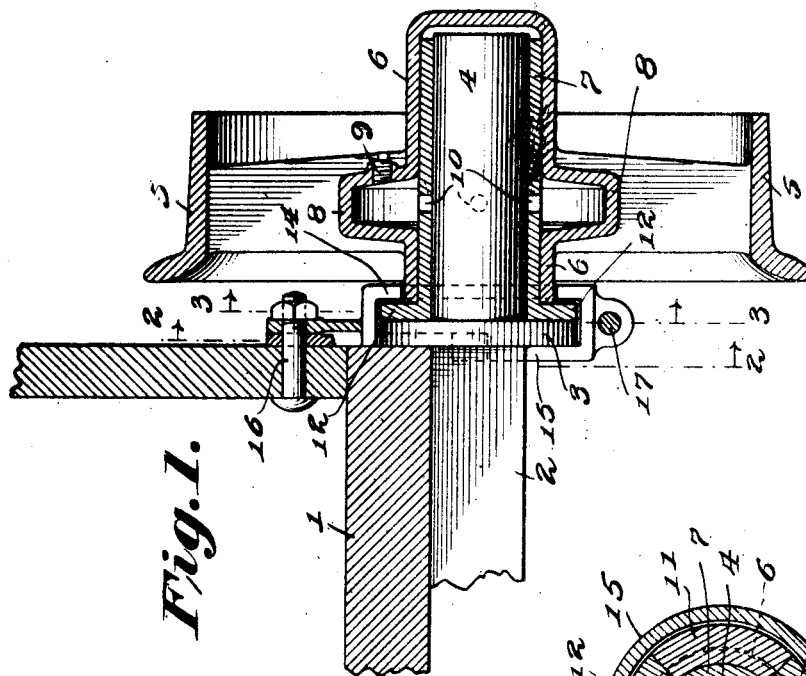
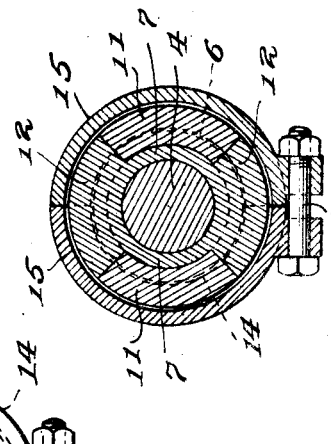
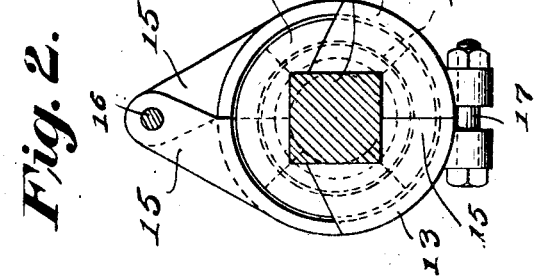
Witnesses
N. N. Lybrand
S. Jay Teller
Inventor
Walter A. Dorsey
By H. F. Bliss
Attorneys

UNITED STATES PATENT OFFICE.

WALTER A. DORSEY, OF COLUMBUS, OHIO, ASSIGNOR TO THE BONNEY FLOYD COMPANY, OF COLUMBUS, OHIO, A CORPORATION OF OHIO.

CAR WHEEL AND AXLE.

1,129,855.   Specification of Letters Patent.   Patented Mar. 2, 1915.

Application filed July 3, 1914. Serial No. 848,866.

*To all whom it may concern:*

Be it known that I, WALTER A. DORSEY, a citizen of the United States, residing at Columbus, in the county of Franklin and State of Ohio, have invented certain new and useful Improvements in Car Wheels and Axles, of which the following is a specification, reference being had therein to the accompanying drawings.

This invention relates especially to car wheel and axle constructions of the type especially adapted for use on small cars such as are commonly used about coal mines.

The principal object of the invention is to provide an improved means for so connecting the wheel to the axle that it can readily be removed.

A further object is to provide in combination with the means for holding the wheel in place an improved axle engaging bearing sleeve.

In the accompanying drawings, Figure 1 is a vertical sectional view through one side of a car showing a wheel and an axle with associated parts embodying my invention; Fig. 2 is a sectional view taken along the line 2—2 of Fig. 1; Fig. 3 is a sectional view taken along the line 3—3 of Fig. 1.

Referring to the drawings, 1 represents the car body, which can be of any usual or preferred construction.

2 represents the axle, which preferably has its central part square so that the car body can rest directly upon it. The axle has the circular collar 3 and the cylindrical outer section 4 which serves as a bearing for the wheel.

5 is the wheel having the usual rim and spoke construction. The hub 6 of the wheel is entirely closed at the outer end and is bored to receive a bearing sleeve 7 which has a running fit with the axle. Preferably the hub of the wheel is formed with an annular oil reservoir 8 which can be filled through the aperture normally closed by the plug 9. The sleeve 7 is provided with apertures 10 through which oil can pass from the reservoir to the bearing surfaces. At the inner end of the hub 6 there is formed an outward turned flange 11 which abuts against the collar 3 on the axle. The bearing sleeve 7 is provided with means for locking it to the wheel for rotation therewith and by preference this means consists of outward turned flange elements 12, 12, adapted to lie in openings formed in the flange 11 on the hub. This construction is clearly shown in Fig. 3.

For holding the wheel against movement longitudinally of the axle I provide a clip or clips which engage the collar 3 and the wheel flange 11. As shown, there are two clips 13, 13, which contact with each other to form a complete ring inclosing the collar and the flange. As shown, the clips 13, 13 are provided at the outer side with an annular in-turned lip 14 which engages the flange 11 and at the inner side with an inward turned lip 15 which engages the collar 3. Preferably the two clip elements 13, 13 are provided with upstanding ears 15, 15, 18 which are apertured to receive the pivot bolt 16 secured to the body of the car. It will be seen that the two elements 13, 13 can swing in opposite directions about the bolt 16 into or out of engagement with the axle and the wheel. The elements can be held in their inner wheel-and-axle-engaging positions by means of the bolt 17.

When it is desired to remove the wheel for any purpose it is only necessary to remove the nut on the bolt 17 and swing the two clips 13, 13 apart. The wheel can then be readily moved off from the end of the axle. When the wheel has been removed the bearing sleeve 7 can be taken out easily and can be replaced if it is found to be worn. However, when the wheel is held in place on the axle the bearing sleeve 7 is also held in place, it being held by the collar 3 against movement in one direction, and by the wheel itself against movement in the other direction. It will be noted that any strains applied to the wheel and tending to move it longitudinally of the axle are transmitted directly to the axle and not to the car body. The pivot bolt 16 serves merely to support the clips 13, 13 and does not take any of the force.

What I claim is:

1. The combination in a car, of the axle having a collar formed thereon, the wheel on the axle having a flange at its inner side on the axle, and the engaging the collar on the axle, and the clip pivoted to the car body and loosely engaging the said collar and flange to prevent movement of the wheel longitudinally of the axle.

2. The combination in a car, of the axle having a collar formed thereon, the wheel on the axle having a flange at its inner side engaging the collar on the axle, the two clips pivoted to the car body and each loosely engaging the said collar and flange to prevent movement of the wheel longitudinally of the axle, and means for connecting the two clips to prevent their disengagement from the axle and the wheel.

3. The combination in a car, of the axle having a collar formed thereon, the wheel on the axle having a flange at its inner side engaging the collar on the axle, the two clips pivoted to the car body for movement about a common axis and each loosely engaging the said collar and flange to prevent movement of the wheel longitudinally of the axle, and means for connecting the two clips to prevent their disengagement from the axle and the wheel.

4. The combination in a car, of the axle having a collar formed thereon, the wheel on the axle having a flange at its inner side engaging the collar on the axle, the detachable axle-engaging bearing sleeve for the wheel held by the axle collar against movement in one direction and held by the wheel against movement in the other direction, and the clip loosely engaging the said collar and flange to prevent movement of the wheel longitudinally of the axle.

5. The combination in a car, of the axle having a collar formed thereon, the wheel on the axle having a flange at its inner side engaging the collar on the axle, the detachable axle-engaging bearing sleeve for the wheel having a flange element interlocked with the said wheel flange, and the clip loosely engaging the said collar and flange to prevent movement of the wheel longitudinally of the axle.

In testimony whereof, I affix my signature, in presence of two witnesses.

WALTER A. DORSEY.

Witnesses:
HARRY E. WEST,
H. S. RANSOM.